May 30, 1961     H. A. TOULMIN, JR     2,986,456
LIQUID HYDROCARBON FUEL CONTAINING POWDERED
COAL, METAL AND CATALYST
Filed Aug. 20, 1954
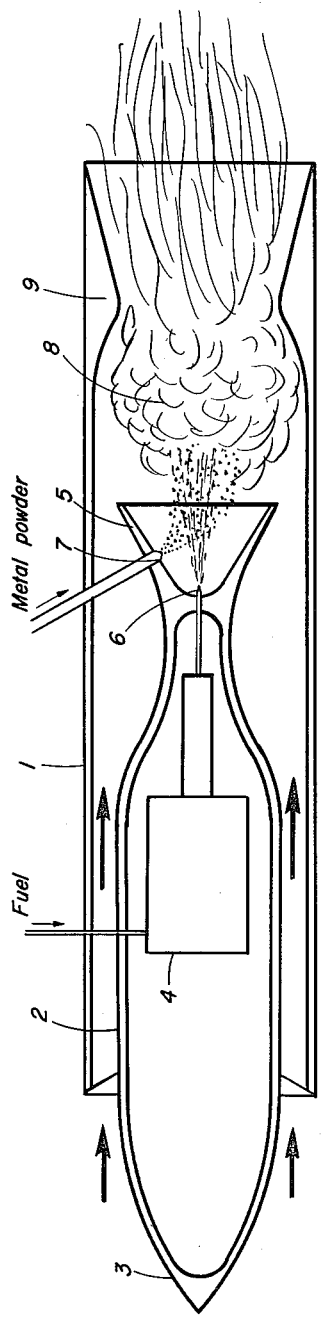
INVENTOR.
HARRY A. TOULMIN, Jr.
BY
Attorneys United States Patent Office 2,986,456
Patented May 30, 1961

2,986,456

LIQUID HYDROCARBON FUEL CONTAINING POWDERED COAL, METAL, AND CATALYST

Harry A. Toulmin, Jr., Dayton, Ohio, assignor, by mesne assignments, to Commonwealth Engineering Company, Dayton, Ohio, a corporation of Delaware Filed Aug. 20, 1954, Ser. No. 451,307

2 Claims. (Cl. 52—.5)

The invention is particularly useful in providing a carbonaceous containing fuel, for example powdered coals, lignites, pulverized charcoal, coke breeze and the like, which fuel burns easily and quickly to produce ultra high heating temperatures and high velocity gases and such as heretofore has not been attained with conventional fuels.

It is a principal object of the invention to extract the highest B.t.u. values from coal or the like carbonaceous material whereby the same may be used as a suitable fuel in jet airplane engines, gas turbines, explosives, propellants, rockets, power plants, and the like, as used in the fields of aviation, rail transportation, agricultural distribution systems for fertilizer and insecticides, destruction of vegetation, and as may be useful for military purposes, as for example flame throwers, fire bombs, etc.

It is another object of the invention to provide a composition useful as fuels, explosive products or as ignition catalysts for initiating and promoting high temperature reactions and high velocity hot gases.

It is another object of the invention to provide a combustible composition which has very short flame propulsion area and which exhibits an accelerated rate of combustion due to the highly pyrophoric character of the fuel mixture.

It is another object of the invention to provide a powdered fuel mixture which may be used in the form of a slurry containing metal and carbonaceous dusts dispersed in a liquid hydrocarbon, and which produces a large amount of exothermic heat during combustion.

A still further object of the invention is to provide a method for accelerating the combustion of powdered materials whereby the flame spreads through the mass of fuel and brings about the exploding and rapid disintegration of each of the particles of fuel. The powdered fuel mixture of the invention is characterized by exhibiting a high flame speed during combustion and the production of a high pressure area. By utilizing a proper concentration of the metal dust, carbonaceous powder and/or auto oxidation catalysts, and dispersing the same while introducing a sufficient supply of air or oxygen to provide for complete combustion of the fuel, maximum evolution of heat is obtained during burning of the fuel.

In accordance with the invention, a basic process is provided for obtaining the maximum heat of combustion from fuels especially powdered coals. The invention will be described more particularly with reference to the use of powdered coals, however, as heretofore pointed out, other combustible materials of similar nature also may be used.

In preparing the fuel mixture powdered carbonaceous material, such as coal is admixed with metal powder or dust, for example aluminum or magnesium metal particles. The particle size of the carbonaceous material is generally less than 1000 microns (1000 mu) and preferably on the order of a micron or less in diameter. This mixture of metal dust and carbonaceous material may be used as the fuel as a dry powder or admixed with liquid hydrocarbon to form a slurry. A catalyst, however, is preferably added to the mixture to accelerate the rate of combustion.

To catalyze and enhance the combustion rate of the materials and produce a high temperature reaction, there is introduced a small amount of a metallic soap or mixture of such metallic soaps, for example 0.1 to 5% by weight of the solid constituents of the fuel comprises a metallic soap such as a stearate, palmitate, oleate, ricinoleate, etc., of aluminum, magnesium, titanium, zirconium, tin and the like which compounds exhibit auto oxidation catalytic properties. The metal particles of the fuel mixture are in the form of dust or flakes, with metallic soap being preferably coated on or admixed with the flakes of metal, e.g., aluminum metal flakes coated with aluminum stearate and mixed with coal dust forms an excellent fuel mixture. Mercury metal in small amounts, e.g. 0.1 to 1% by weight of the fuel powder mixture also may be added to enhance the catalytic action. Mercury compounds, such as mercury peroxide or fulminate, may be used in place of mercury metal for this purpose.

Where the fuel is to be employed as a liquid, the carbonaceous material such as powdered coal, metallic flakes or dust and/or catalytic substance are dispersed in a liquid hydrocarbon, for example kerosense, gasoline, diesel oil, etc., which provides a liquid combustible carrier for the powdered materials. Such a fuel is useful for operating jet engines and high temperature fuel operated prime movers, and where the maximum B.t.u.'s are to be extracted from the burning fuel in a predetermined time.

For promoting the oxidation and increasing the speed for burning of the fuel, a peroxide such as hydrogen or benzyl peroxide etc. may be introduced into the fuel mixture initially or during the burning of the same. For this purpose 0.5 to 2% by weight of the fuel solids may comprise a peroxide.

As specific examples of the improved fuel of this invention, there is admixed with powdered coal such as bituminous, semi-bituminous or anthracite coals, having a particle size on the order of 20 microns to sub-micron size, aluminum metal dust, preferably as powdered metal foil of a particle fineness equal to the coal dust, and constituting from 1 to 20 parts by weight of the mixture of coal and metal powder. In place of aluminum metal, magnesium metal or other readily oxidizable metals such as tin, zirconium, titanium, zinc etc. metal particles in the form of flakes, may be used. Aluminum flakes coated with a small amount of aluminum or magnesium stearate, or the like metallic soap as aforementioned, admixed with powdered coal is preferably used.

The metallic soaps utilized as auto oxidation catalysts are preferably salts of metals in groups II, III and IV of the periodic table, representatives of which are the stearates or palmitates of aluminum, magnesium, titanium, zirconium and tin.

The powdered fuel mixture may be used in the form of a slurry admixed with liquid hydrocarbon. For example, powdered metal such as aluminum metal flakes, with or without metallic soap, e.g., aluminum stearate and powdered coal is introduced into an oil such as gasoline, kerosene, fuel oil, or the like, as described. This slurry of oil, powdered coal and metal particles may be sprayed into a combustion chamber or engine and mixed with air or oxygen and burned. In general, one to twenty-five parts of the solid fuel constituents to 100 parts by weight of the liquid hydrocarbon provides a suitable liquid fuel mixture. Higher or lower proportionate amounts of the liquid hydrocarbon and powdered fuel constituents may be employed as needed, to provide a fuel having the requisite consistency and burning characteristics desired. The powdered coal and powdered metal may be mixed with the liquid hydrocarbon either before or during burning of the fuel. Additional oxygen in the form of peroxides, e.g., benzyl peroxide may be added as a supplement to air for increasing the speed of burning or combustion of the fuel mixture as aforementioned.

The presence of metal particles such as aluminum, magnesium, tin or the like, is an essential constituent of the fuel. Such metal particles which are combustible and tend to vaporize readily produce a high temperature reaction during the combustion. The very high temperatures produced during the reaction causes the coal particles to be disintegrated and vaporized. The combustion of the powdered coal thus proceeds at a high rate. This high temperature and explosive action is enhanced by the catalytic action of metallic soaps which is preferably present or introduced. The high temperatures produced combined with the violent disintegration and vaporization of the fuel particles is believed to account for the unexpected results produced. Utilizing such a fuel mixture, the extraction of maximum B.t.u.'s from the coal dust is thereby achieved.

Heretofore, in the combustion of coal or the like carbonaceous particles, the maximum B.t.u.'s have not been obtained principally because the initial heating of the coal particles did not result in the production of temperatures high enough to disintegrate and vaporize the coal particles and permit air or oxygen to come in contact with all the particles of the coal and support its combustion to completion. In other words, under conventional combustion reactions using powdered coal there was always a certain minimum amount of the coal particles which were not burned to completion but passed off as smoke.

In accomplishing the high combustion and maximum extraction of B.t.u.'s from coal or the like carbonaceous material in accordance with this invention, it is requisite that the reaction be conducted so that the boiling point or vaporization point of the combustion material be lower than the flame temperature and that the heat of vaporization is lower than the energy required to initiate rapid surface oxidation or combustion.

The presence of metal powders with or without metallic soaps facilitates the reaction of the coal dust and provides a high temperature reaction so that the maximum B.t.u.'s are obtained from the coal or carbonaceous dust particles. During combustion of the fuel the high temperatures produced rapidly transform the coal particles into gases at high temperatures. In this connection it has been observed that in the presence of a small percentage of gas, such as methane gas, the explosive limit or temperature at which coal dust reacts with oxygen with explosive force is lowered so that the dust cloud of coal particles is very sensitive and ignites at a lower temperature and with increased violence of combustion in the presence of even a small percentage of hydrocarbon gas.

Further, the presence of metal powders such as aluminum or magnesium dust with a petroleum hydrocarbon carrier such as kerosene, diesel oil or the like provides a fuel which is more sensitive to ignition and produces a powdered coal fluid mixture wherein the flame produced by combustion proceeds more rapidly through the fuel, than when the coal dust is employed alone. Moreover, the combustible gases formed by the hydrocarbon likewise enhance this combustion. The efficiency of the combustion and high extraction of B.t.u.'s is further facilitated due to the catalytic action of the metal particles such as magnesium or aluminum powder, particularly in the presence of hydrogen which is formed by decomposition of moisture present and under the high temperature reaction conditions during combustion of the fuel.

In addition to the high rate of reaction and production of high temperatures during combustion of these dust particles of coal and metal, which comprise oxygen adsorbed on the dust particles, it has been found that the addition of a small amount of a metallic soap such as aforementioned, for example aluminum, magnesium stearate or oleate or the like, will further accelerate this ignition and flame propagation during combustion of the fuel. This is probably due to the fact that the porous surface of the particles adsorb gas from the surrounding atmosphere and the metallic soap catalyzes the reaction.

To prevent explosion and to facilitate combustion an excess of oxygen in the atmosphere is preferred and is introduced into the fuel either from the air or from the use of a mixture of air and peroxide, as heretofore explained. In this manner it is possible to produce the combustion at a lower ignition temperature and increase the rate of combustion and the adsorption of oxygen on the dust particles. This, as pointed out above, is facilitated apparently due to the adsorption of oxygen on the solid particles of the fuel mixture.

The presence of metal particles such as aluminum, magnesium or the like oxidizable material in the form of dust provides a catalytic agent for increasing the rate of combustion and temperature thereof. The combustion rate promoting catalysts produce a fuel which has a lower explosive limit or temperature, particularly in the presence of methane, oxygen or air, and results in the enhancement of the combustion of the fuel.

The presence of iron oxide particles produces a somewhat similar catalytic effect but with less intensity and thus such metallic oxide material may be employed as a substitute catalyst. All of these catalysts tend to increase or promote the rate of thermal decomposition of the fuel constituents and facilitate the combustion of the powdered coal or like carbonaceous material employed.

It is further observed that the presence of metal particles in the form of dust act not only as catalyst for increasing the rate of ignition or combustion of the fuel, but they also function as a negative catalyst by serving as a reaction chain breaker, that is, they form intermediate compounds which generally are of greater stability so that they do not decompose or regenerate the catalyst. This control of the combustion and explosive properties of the fuel can thus be effected by utilizing different oxidizing agents and in various proportions. In this manner the incendiary action of the fuel may be controlled so as to either accelerate the combustion or burning up of the fuel particles or slow down their combustion as may be required in the use of the fuel. Thus, for making a fuel useful in internal combustion engines utilizing carbonaceous powdered material, the combustion may be speeded up by the use of the catalyst so that the mixture will burn and provide the high temperature reaction gases necessary to propel the piston in a predetermined time. In other instances where the fuel is required to burn more slowly, the use of negative catalysts such as those which do not accelerate the combustion but tend to decelerate the combustion are incorporated in the fuel.

The coal or carbonaceous particles used may comprise bituminous or anthracite coals, coke or lignite as aforementioned, and equivalent carbonaceous materials which have an affinity for oxygen and which upon combustion produce volatile matter, moisture and ash. It is preferred to use coal dust particles of uniformly small size as explained, but where the highest degree of acceleration of the combustion is desired, the particle size of coal used is preferably on the order of one micron or less. Utilizing such very fine particles of carbonaceous material it is found that the rate of combustion increases with the decrease in particle size because the finer divided particles provide greater surface area for reaction in a given time. This results in a better mixing and dispersion of the particles of coal with respect to the other ingredients and oxygen or air more rapidly contacts the same and combustion increases at a higher rate. Furthermore, the finer particle size produces a higher rate of oxidization and a higher volume of oxygen is adsorbed per unit weight of the dust particles. Accordingly, it is preferred to use a major amount of fine particles, particularly of a size of a micron or lower in diameter. Also the electric capacitance per unit weight of fine dust is greater and thus a larger release of energy can be developed and the fine dust particle is more readily dispersible and remains longer in the fuel liquid medium when such a liquid carrier is used.

In the case of metal dust such as aluminum dust and similar metal dust, the ignition of the same is believed to have an electric or electronic origin as opposed to thermal ignition. The electrical discharges or ionization is believed to produce ozone and aluminum oxide ($Al_2O_5$) which reacts with the fine dust particles and initiates the decomposition of the same and flame propagation during the combustion of the fuel.

The electrical ignition depends largely upon the production of a sufficient concentration of charged particles and which results from electronic collisions due to ionization of the materials or the presence of ions or ionized particles in the explosive mixture. This electronic phase of the combustion is believed to play an important role in the increased efficiency of the fuel of this invention. The same is substantially true in the case of thermal ignition.

It is also considered to be immaterial whether the theory of predistillation of dust during ignition and combustion takes place or whether such a theory may be used to explain what happens to the fuel during combustion, or whether it involves some other theory for the production of the improved results. In the case of the predistillation theory of dust ignition, it is believed that all dust ignition involves purely a gas or vapor explosion and that the energy of the ignition source provides heat to decompose the dust particles thus causing the evolution of the volatile matter. In this manner the volatilized gassy particles mix more readily with air and ignite and the combustion proceeds at a high rate and the heat produced in turn further heats and volatilizes other particles not yet volatilized.

One of the objections made to the above theory has been that the ignition temperatures of some dust, including coal, are lower than the ignition temperatures of the gases involved such as methane or the like hydrocarbon. However, there seems to be some support for the theory that during the initial heating and combustion of the dust there is not enough air present at the surface of the particle to continue to support the combustion, and consequently the temperature rises above the ignition point of the solid causing it to distill and eventually to ignite, thus initiating the combustion reaction.

In the preferred process of carrying out the combustion of the novel fuel of this invention, it is sought to have the concentration such as will provide sufficient heat to produce complete oxidization of the dust particles and thus release the maximum B.t.u.'s. The heat produced by complete oxidization of a portion of the dust particles in the available oxygen is enough to heat the rest of the dust in the mixture to bring the same to the ignition temperature. Theoretically, neglecting disassociation, the strongest explosion or greatest explosive force should be produced at a concentration corresponding to stoichiometric weight mixtures of the fuel ingredients. This can be computed if the chemical composition of the dust is known and provided complete combustion of the material is assumed to take place. In practice, however, somewhat richer dust mixtures are found to be the most explosive.

The adjustment of these mixtures to provide the greatest heat production is facilitated by the catalytic action of the metal powder, for example powdered metal such as aluminum, magnesium, tin, etc. and the fluid carrier which is preferably hydrocarbon as described. The initial temperature, pressure, oxygen content, humidity, specific heat and heat conductivity of the atmosphere all are factors which influence the dust explosion. The presence of oxygen is, of course, a most important factor.

As a source of ignition it is preferred to utilize a flame or hot surface. The presence of moisture which normally is a constituent of coal dust or the like carbonaceous materials is advantageous since it reacts with the metal powder and similar materials at the reaction temperatures and results in the evolution of hydrogen gas. The production of hydrogen gas is effected particularly at elevated temperatures wherein decomposition and ionization of moisture is produced. This reduces the surface oxide coating which would otherwise tend to form on the particles and thus makes the fuel mixture highly sensitive to ignition and combustion.

Other pyrophoric dust particles may be present such as finely divided metal powders of iron, manganese, copper, uranium, nickel, zirconium and others, metal oxides, hydrides, carbides, nitrides and metal alloys which also oxidize so rapidly on exposure to air that they heat and ignite. While there is no apparent agreement regarding the exact mechanism of the pyrophoric ignition, it is believed that the process varies somewhat with the type of dust, its fineness and surface character.

The basic discovery in this invention is that by utilizing a combination of combustible metal dust with coal dust that the combustion can be achieved and controlled whereby the maximum liberation of gas and heat results from the reaction. The pyrophoricity of these dusts, as herebefore mentioned, is believed to be related to a metastable internal equilibrium in the powders. Thus, one of the advantages of utilizing a combination of these dusts of pyrophoric character, including aluminum and/or magnesium metal dusts, is that with a sufficient dispersion these extremely fine particles, the same will self-ignite by an electrostatic spark discharge within the cloud of dust.

Particularly satisfactory results have been secured with dust samples of finer than 200-mesh. This fuel can be passed through an electrically heated cylindrical Alundum-core furnace construction for ignition. The ignition temperatures for the dust will range from about 200° C. to more than 1000° C. These figures depend upon the dispersibility, fineness, uniformity of the dust, the ignition source, the timing of ignition and the interpretation of what constitutes limiting flame propagation.

The igniting energy of these dust clouds varies with the fineness, the moisture content and somewhat with the concentration in the cloud. For instance, undispersed layers of zirconium powder have been ignited by sparks of less than 1 microjoule (1 muj.) energy while other dusts take considerably stronger sparks. The igniting energy of dust clouds in air ranges from about 10 millijoules (10 mj.) to several joules.

The igniting source generally preferred is a high voltage induction spark. When these dusts are thus ignited the pressure is developed to more than 150 lb./in.$^2$ and rises to an average rate of pressure of about 5000 lb./in.$^2$ per second and the maximum rates to more than 10,000 lb./in.$^2$ per second. When using a high voltage continuous induction spark and dispersing the dust through a furnace at 850° C. a satisfactory result can be secured.

The minimum concentration of coal dust that will propagate large-scale explosions is approximately 50 mg./liter (0.05 oz./ft.$^3$) of air. Pressure is nearly 150 lb./in.$^2$ and flame velocities in excess of 6000 ft./sec. have been accomplished by the employment of the thermal properties of the coal dust and the catalysts of aluminum and similar other dusts. As heretofore stated, in the presence of a liquid hydrocarbon fuel and oxygen, it is possible to achieve temperatures and gas velocities of great magnitude and by adjusting the fineness of the materials involved, the amount of moisture present and the oxygen, the maximum energy can be released.

The invention as illustrated in the drawing is utilized as a fuel mixture in a ram jet.

As illustrated schematically in the drawing, a typical ram jet is shown which comprises an outer shell 1 and an inner center body 2 spaced therefrom and having a rounded nose portion 3 for directing an air stream thereabout and between the center body and the shell 1, the air stream flowing over the nose and backwardly through the shell, as indicated by the arrows.

A fuel pump 4 delivers liquid hydrocarbon fuel under pressure to a burner 5 through a nozzle means 6. Powdered fuel is admixed with the liquid fuel discharged from the nozzle 6 through a feed line 7, the same being delivered under pressure. The fuel mixture such as liquid hydrocarbon, air and metal powder, with or without the presence of coal dust, is ignited and burned as at 8 and the hot gases discharged under high pressure through the exhaust nozzle 9 of the ram jet shell. The heat of the ignited mixture of fuel and metal powder produces a high temperature combustion and large volume of hot gases which provide the propelling force for the ram jet.

It will thus be seen that the present invention provides a novel fuel and method of producing high temperature combustion reactions, and wherein dust particles of carbonaceous and metal particles form a principal constituent. Further, the invention provides a fuel wherein carbonaceous material such as coal dust is utilized to produce a high temperature fuel and wherein the maximum B.t.u. values are obtained from the coal.

It is understood that various changes and additions may be made in compounding the fuel of this invention and that the proportionate amount of ingredients may be varied over a relatively wide range, depending upon the particular use to which the fuel is to be put. Such changes and variations are contemplated to come within the spirit and scope of this invention, and which are more particularly set forth in the appended claims.

What is claimed is:

1. A rapid burning fuel composition which is adapted to be admixed with oxygen and burned, consisting essentially of the following constituents by weight—5 parts of powdered coal, 20 parts of powdered metal, 0.1 to 5% of aluminum stearate based on the fuel solids, 0.5 to 2% of benzyl peroxide based on the fuel solids, and 100 parts of volatile liquid hydrocarbon.

2. A rapid burning fuel composition which is adapted to be admixed with oxygen and burned, consisting essentially of the following constituents by weight—5 parts of powdered coal, 20 parts of powdered aluminum metal, 0.1 to 5% of aluminum stearate based on the fuel solids, 0.5 to 2% of benzyl peroxide based on the fuel solids, and 100 parts of volatile liquid hydrocarbon, said powdered aluminum metal and said powdered coal each having a particle size on the order of 20 microns to submicron size to enhance the burning rate of the composition.

References Cited in the file of this patent

UNITED STATES PATENTS

| | | |
|---|---|---|
| 523,117 | Givens | July 17, 1894 |
| 1,112,234 | Stuart | Sept. 29, 1914 |
| 1,506,323 | O'Neill | Aug. 26, 1924 |
| 2,227,256 | Haffner | Dec. 31, 1940 |
| 2,416,639 | Pearsall | Feb. 25, 1947 |
| 2,530,492 | Van Loenen | Nov. 21, 1950 |
| 2,530,493 | Van Loenen | Nov. 21, 1950 |
| 2,560,542 | Bartleson et al. | July 17, 1951 |
| 2,606,107 | Fieser | Aug. 5, 1952 |
| 2,800,172 | Romer et al. | July 23, 1957 |

FOREIGN PATENTS

| | | |
|---|---|---|
| 31,684 | Netherlands | Nov. 16, 1933 |
| 676,204 | Great Britain | July 23, 1952 |

OTHER REFERENCES

"Incendiary Fuels for Various Purposes," Cawley et al., pp. 90–102, August 1946.